United States Patent Office 3,264,273
Patented August 2, 1966

3,264,273
PROCESS FOR REACTING A POLYEPOXIDE
WITH A POLYACID
Sylvan O. Greenlee, Lafayette, Ind., assignor to Johnson
& Johnson, a corporation of New Jersey
No Drawing. Filed Oct. 12, 1962, Ser. No. 230,250
7 Claims. (Cl. 260—79.5)

The present invention relates to the making of infusible polyepoxide resins and more particularly to the making of such resins through the reaction of polyepoxides with polythioxyalkanoic acids.

In co-pending application Ser. No. 85,437, filed January 27, 1961, are described polyepoxide conversion products formed by reacting a polyepoxide having a functionality of greater than one vicinal epoxy group per molecule with polythioxyalkanoic acids. The term epoxide as used throughout this disclosure refers to vicinal epoxides. As described in this application, one of the advantages derived from using thioxyalkanoic acids wherein the thioxyalkanoic acid is a polyacid containing at least one thioether group and at least two carboxylic groups is the low temperature at which the conversion reaction occurs while still giving epoxide conversion products that have good acid and solvent resistance. Although the thioxyalkanoic acids react readily with terminal epoxide groups and epoxide groups attached to five and six member rings, the thioxyalkanoic acids are sluggish in their activity when the polythioxyalkanoic acid conversion of polyepoxides is carried out with polyepoxides which contain primarily non-terminal epoxide groups attached to non-cyclic aliphatic chains.

While reactive with thioxyalkanoic acids, non-terminal epoxide groups, such as those found in the epoxidized vegetable oils, would possess substantially greater commercial attractiveness if their activity could be controllably speeded up. Similarly, the epoxidation products from the liquid butadiene polymers and copolymers, containing a large portion of their epoxide groups as the non-terminal type, are sluggish in their activity with polythioxyalkanoic acid conversion systems thus detracting from their suitability for some applications, particularly for room temperature cured protective coatings. Attempts made to speed up such reactions through the inclusion of tertiary amines in the reactants fail to give the desired activation even though tertiary amines are known to catalyze generally the reaction of carboxylic acids with epoxide groups.

It has now been discovered that the inclusion of small amounts of phosphoric acid with the polythioxyalkanoic acids and the polyepoxides markedly accelerates the conversion reaction between the polythioxyalkanoic acids and the polyepoxides in obtaining conversion products.

The amount of phosphoric acid used in the conversion system depends on the rate of reaction desired and on the reactivity of the thioxyalkanoic acid with the particular polyepoxide used. In practicing the present invention, the phosphoric acid is generally not used in amounts of more than about 5% of the reactants present. Phosphoric acid in amounts as little as 0.1% by weight of the reactants was found to catalyze the reaction. However, the phosphoric acid is generally used in amounts of 0.25–4% of the total weight of the thioxyalkanoic acid and polyepoxide present depending on the rate of reaction desired and the reactants used.

The activity of the phosphoric acid and its use in catalyzing the reaction between the polythioxyalkanoic acid and the polyepoxide is best illustrated by the following examples which are given for the purpose of illustration only.

In these examples, all cures are made at room temperature, about 25° C. Viscosities are measured with the Gardner Bubble Viscometer. The films referred to are film spreads of 0.003 inch wet thickness and the film hardness is measured with a Sward Rocker with the value for a flat glass plate set at 100. All viscosities and film tests are run at room temperature, approximating 25° C.

*Example 1*

A polythioxyalkanoic acid, referred to as "Polyacid A," is formed as follows.

In a two-liter, three-neck flask provided with a mechanical stirrer, a thermometer and a heating mantle is placed 333 grams of a liquid copolymer of butadiene (80 parts) and styrene (20 parts) and 333 grams of toluene. The liquid butadiene-styrene copolymer used is of low molecular weight (8,000–10,000) and high unsaturation (iodine number around 300) with 55–65% of the unsaturation of terminal olefin type. A butadiene-styrene copolymer of this type is sold under the trade name Buton 100. With continuous stirring 200 grams of mercaptoacetic acid is added. The temperature rises from 25° C. to 65° C. over a period of about 5 minutes due to the exothermic reaction of the reactants. The reaction mixture is held at 60–65° C. for 1 hour and the temperature is then raised to 100–101° C., the reactants being maintained at this temperature for another hour. After this the unreacted mercaptoacetic acid is removed by gradually increasing the temperature to 160° C. while reducing the pressure to 17 mm. of mercury. The resulting product is a light straw-colored, sticky solid product amounting to about 520 grams and having an acid value of 217 (equivalent weight=260).

*Example 1A*

A reaction mixture is prepared by dissolving equivalent amounts of an epoxidized soya oil having an epoxide equivalent weight of 235 (sold under the trade name Epoxol 7–4) and the above "Polyacid A" in a 50:50 mixture of toluene and methyl isobutyl ketone to give a concentration of 50% nonvolatiles. This solution has an initial viscosity of A–A1, a viscosity of A after 1 day and a viscosity of B after 3 days. Films formed from this solution show slight tack after 2 days, and are tack-free with a Rocker hardness (RH) of 4 after 3 days.

When phosphoric acid is added to the reactants in an amount equal to 1% by weight phosphoric acid of the total weight of the reactants, the viscosity of the solution is B after 4 hours and V–W after 3 days. Films formed from the solution containing the 1% by weight phosphoric acid give RH=5 after 2 days. With 2% phosphoric acid viscosity of the solution is B in 1 hour, G in 4 hours and X in 9 hours. Films formed from the solution containing 2% by weight phosphoric acid are tack-free and give RH=4 after 6 hours and RH=12 after 3 days.

With 4% phosphoric acid viscosity of the solution is E in 1 hour, K in 2 hours and a gel is formed in 3.5 hours. A film spread from the solution is tack-free in 2 hours with an RH=4, has an RH=8 in 7 hours and an RH=14 in 3 days.

Example 1B

A reaction mixture of 1 equivalent of the epoxidized soya oil used in Example 1A and 0.75 equivalent of the above "Polyacid A" is dissolved in methyl isobutyl ketone to a concentration of 50% nonvolatile. The solution at 50% nonvolatile has an original viscosity of A1 and after 2 days a viscosity of A1+. A film formed of this solution remains tacky for at least 3 days. When phosphoric acid is added to the solution of reactants in an amount equal to 4% by weight phosphoric acid of the total weight of the reactants, the viscosity after 1 hour is E–F and a gel is obtained in 4 hours. A film formed of the solution of reactants containing the phosphoric acid gives no tack and an RH=8 in 4 hours.

Example 1C

A reaction mixture of equivalent amounts of an epoxidized vegetable oil having an epoxide equivalent weight of 176 and "Polyacid A" is formed by dissolving these reactants in methyl isobutyl ketone to give a solution having a 50% nonvolatile content. This solution has an original viscosity of A+. After 24 hours the solution has a viscosity of B and after 48 hours has a viscosity of C. A film prepared from the solution is tacky after 24 hours and after 48 hours is tack-free with an RH=6.

When 0.5% by weight phosphoric acid is blended with the epoxidized oil and "Polyacid A" in forming the methyl isobutyl ketone solution, the viscosity of the reaction mixture after 3 hours is D, after 24 hours is H, and after 48 hours is R. A film spread from the solution containing 0.5% phosphoric acid is tack-free after 24 hours with an RH=6. When the phosphoric acid is added in amounts of 1% by weight of the reactants, the viscosity of the solution is J after 8 hours, Y after 20 hours, and a gel in 22.5 hours. A film formed of the solution containing the 1% phosphoric acid is tack-free after 24 hours and has an RH=8.

With 2% phosphoric acid added to the polyepoxide and polyacid, the solution has a viscosity E–F after 1 hour, a viscosity of V after 4.5 hours and is a gel in 5.5 hours. A film formed of the solution containing the 2% phosphoric acid is tack-free after 8 hours with an RH=6 and has an RH=14 in 24 hours.

Example 1D

A reaction mixture is prepared containing equivalent amounts of a liquid epoxidized butadiene polymer having a viscosity of 1800 poises, an equivalent weight to epoxide of 179 and an iodine value of 185 (sold under the trade name Oxiron 2000) and "Polyacid A" by dissolving these reactants in methyl isobutyl ketone to give a solution of 40% nonvolatile. The solution at 40% nonvolatile has a viscosity of A1. After 9 hours the viscosity is B. A film formed of the solution has a slight tack after 9 hours and is tack-free in 24 hours with an RH=12.

When 1% phosphoric acid by weight of reactants is added to the solution mixture of the epoxidized butadiene polymer and "Polyacid A," the solution obtains the viscosity of L in 3 hours and Z in 4 hours. A film of the solution after 5 hours is tack-free and has an RH=6.

Example 2

A polythioxyalkanoic acid, hereinafter referred to as "Polyacid B," is formed as follows.

In a five-liter, three-neck flask provided with a mechanical stirrer, a thermometer and a heating mantle is placed 500 grams of the same liquid copolymer of butadiene and styrene used in Example 1, 600 grams of toluene and 230 grams of mercapto propionic acid.

With continuous stirring the temperature of the reaction mixture is raised to 60° C. and then held at 60–76° C. for 1 hour, after which it is heated to 107° C. and held at this temperature for 3 hours. A water cooled receiver is attached and the pot temperature gradually increased to 160° C. while reducing the pressure to 20 mm. of mercury and then finally to 2 mm. of mercury to draw off the solvent. The residue is a light straw-colored sticky solid product amounting to 719 grams and has an acid value of 175 (equivalent weight=320).

Example 2A

A reaction mixture is prepared of equivalent amounts of the epoxidized butadiene polymer used in Example 1D and "Polyacid B," dissolved in a 50:50 mixture of toluene and methyl isobutyl ketone to a solution concentration of 45% nonvolatiles. The solution of 45% nonvolatiles has a viscosity of H+. After 24 hours the solution has a viscosity of L. A film spread from the solution is found to be tack-free in 2 days with a hardness of RH=6.

When 1% phosphoric acid by weight of reactants is included in the solution of the epoxidized polymer and "Polyacid B," the viscosity after 1 hour is Y–Z. A film formed by the solution containing the 1% phosphoric acid shows slight tack after 6 hours and is tack-free after 20 hours with an RH=7.

In describing the present invention, only two examples of polythioxyalkanoic acids activated with phosphoric acid have been given. However, the invention is not limited to these specific polythioxyalkanoic acids but the phosphoric acid acts to catalyze the reaction with polyepoxides of any of the polythioxyalkanoic acids of the type described in co-pending application Ser. No. 85,437. These polythioxyalkanoic acids are polyacids containing at least one thioether group and at least two carboxylic acid groups.

The polythioxyalkanoic acids are generally made by the reaction of an organic compound containing terminal olefin groups and a mercapto acid to give a polyacid product having the general formula:

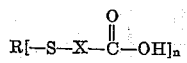

wherein X is selected from the group consisting of alkylene and substituted alkylene groups; and wherein R is an n-valent group selected from the group consisting of: (1) n-valent groups which may be considered as having been formed by removal of n hydrogen atoms from an organic compound selected from the group consisting of hydrocarbons, ethers, esters, polyethers and polyesters, and (2) n-valent substituted derivatives of such n-valent groups; wherein the n-free valence bonds are attached to n different carbon atoms, each of said carbon atoms having an attached carbon atom having an attached hydrogen atom and having all four valences satisfied, each such pair of carbon atoms being a part of a group selected from the group consisting of aliphatic and non-aromatic carbocyclic groups; and wherein n is at least one; and wherein when n is one then R has at least one carboxyl group as a substituent.

In the foregoing formula, in obtaining the desired polyacids containing at least two carboxylic groups, one of the carboxylic groups may be in the R group. Particularly useful as curing agents are the mercapto acid addition products of diene polymers such as butadiene polymers or copolymers having a large proportion of terminal, i.e., 1,2-addition units. As employed herein, the term "butadiene" is intended to embrace both butadiene and its homologues while the term "butadiene polymers" is intended to include butadiene homopolymers and the copolymers of butadiene with other monomers. As is well known to those skilled in the art, butadiene reacts to form polymers composed of 1,2- and 1,4-addition units, each unit being a $C_4$ chain containing a double bond as follows:

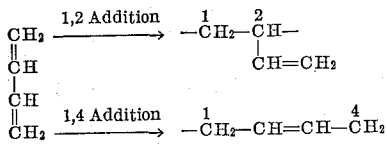

Examples of olefins containing a high percent of terminal (external or vinyl) olefin groups, are polyenes such as "Buton 100" and "Butarez" polymers. These polyenes reportedly contain 55–65% butadiene units as terminal olefin groups and 45–35% of the butadiene units as internal olefin containing units. "Buton 100" is a liquid butadiene-styrene copolymer of low molecular weight (8,000–10,000) and high unsaturation (iodine number approximately 300) and is available commercially from the Enjay Chemical Company. "Butarez" polymers are liquid butadiene polymers which contain on the average 0.8 double bond per $C_4$ unit giving iodine values of 375 to 400, these polymers having molecular weights in the range of 1000 to 2500. These polymers are available from Phillips Petroleum Company. Butarez 5 has a viscosity of 36–37 poises at 25° C. and 5.5 poises as a 90% solution in toluene at 25° C. Butarez 150 has a viscosity of 63–65 poises as a 90% solution in toluene at 25° C. Butarez A has a molecular weight of around 1800, a viscosity of 90–100 poises at 25° C.

Although butadiene polymers or copolymers having high 1,2-addition are particularly useful, polymers having relatively much lower 1,2-addition are quite useful for certain purposes especially when highly elastic and rubbery cured products are needed. Examples of this type are the SBR's (styrene-butadiene rubbers) commonly manufactured and sold in the United States by many companies. While these are similar chemically to the "Buton 100" mentioned previously, they differ in being much higher in molecular weight (100,000 or more), elastomeric solids rather than viscous liquids, and in having relatively less 1,2-addition (20 or 30% rather than 60%). A specific example is "Naugapol 1022," manufactured and sold by Naugatuck Chemical Division of U.S. Rubber Co. This is a styrene-butadiene copolymer containing 23.5% bound styrene, hot polymerized, stabilized with a non-staining antioxidant, glue-acid coagulated, having a Mooney viscosity ML–4 min. at 212° F. of 70–85.

When the polyepoxide conversion products are used as coating compositions, it is preferred that the butadiene polymer used in forming the polyacid curing agent have a relatively low molecular weight (e.g., less than 25,000). When the polyepoxide conversion products are used as adhesives, however, the butadiene polymer used in forming the polyacid curing agent may have a much higher molecular weight.

Additional curing agents which may be used are those derived from the reaction of (1) polyallyl ethers of polyhydric alcohols, such, for example, as pentaerythritols, mannitol, sorbitol, glycerol and starches and (2) mercapto acids. Also useful as polyacid curing agents are the reaction products of mercapto acids with polyallyl esters of polybasic acids (e.g., phthalic, maleic, citric and pyromellitic acids). Other valuable allyl esters for reaction with the mercapto acids are the allyl esters of copolymers of maleic anhydride and styrene. Also useful as curing agents are the reaction products of mercapto acids and unsaturated polyesters, such as the esters of maleic and fumaric acid with glycols. Additional curing agents are those formed by the reaction of an unsaturated acid (e.g., undecanoic acid) and a mercapto acid.

In addition to the aforedescribed polyacid curing agents, another curing agent which may be used is that formed by the reaction of a cyclopentadiene, such, for example, as dicyclopentadiene, with a mercapto acid.

The preferred mercapto acid in forming the polyacid curing agents is mercaptoacetic acid. This acid exhibits high reactivity with olefins in forming polyacid addition products. Beta mercaptopropionic acid, while less reactive than mercaptoacetic acid with a polyene, gives good yields of polyacids in reaction with polyenes. Examples of other acids which may be used in forming polyacid curing agents are mercaptobutyric acid and mercaptopentanoic acids.

Although only a few polyepoxides have been used in illustrating the practice of the present invention, the present invention is not limited thereto and, insofar as I am aware, phosphoric acid when present acts to catalyze the reaction between the polythioxyalkanoic acid and any polyepoxide, including those described in the heretofore mentioned co-pending application Ser. No. 85,437.

Having thus described my invention, I claim:

1. A process for preparing a polyepoxide conversion product which comprises reacting, in the presence of phosphoric acid, a polyepoxide having a functionality of greater than one vicinal epoxy group per molecule with a polyacid of the formula

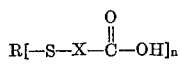

wherein X is a alkylene group; and wherein R is an $n$-valent group selected from the group consisting of: (1) $n$-valent groups selected from the group consisting of hydrocarbons, monoethers, monoesters, polyethers and polyesters each having $n$ hydrogen atoms replaced by $n$ free valence bonds, and (2) $n$-valent substituted derivatives of such $n$-valent groups; wherein the $n$ free valence bonds are attached to $n$ different carbon atoms, each of said carbon atoms having an attached carbon atom having an attached hydrogen atom and having all four valences satisfied, each such pair of carbon atoms being a part of a group selected from the group consisting of aliphatic and non-aromatic carbocyclic groups; and wherein $n$ is at least one; and wherein when $n$ is one then R has at least one carboxyl group as a substituent.

2. A process according to claim 1 wherein the polyacid is a heat-reaction product of a mercapto acid of the formula

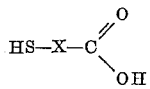

where X is an alkylene group and a diene polymer.

3. A process according to claim 1, wherein the polyacid is heat-reaction product of a mercapto acid of the formula

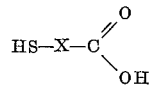

where X is an alkylene group, and a cyclopentadiene.

4. A process according to claim 1, wherein the polyacid is a heat-reaction product of mercapto acid of the formula

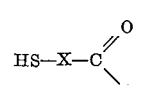

where X is an alkylene group, and a polyallyl ether of a polyhydric alcohol.

5. A process according to claim 1, wherein the polyacid is a heat-reaction product of a mercapto acid of the formula

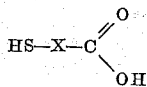

where X is an alkylene group, and a polyallyl ester of a polybasic acid.

6. A process according to claim 1, wherein the polyacid is a heat-reaction product of a mercapto acid of the formula

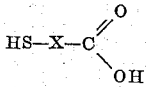

where X is an alkylene group, and a unsaturated polyester.

7. A process according to claim 1, wherein the polyacid is a heat-reaction product of a mercapto acid of the formula

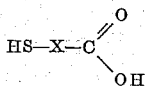

where X is an alkylene group, and an allyl ester of a copolymer of maleic anhydride and styrene.

References Cited by the Examiner

UNITED STATES PATENTS

| | | | |
|---|---|---|---|
| 2,530,882 | 11/1950 | Jansen et al. | 260—481 |
| 2,559,521 | 7/1951 | Smith et al. | 260—537 |
| 2,589,151 | 3/1952 | Serniuk | 260—79.5 |
| 2,712,535 | 6/1955 | Fisch | 260—18 |

WILLIAM H. SHORT, *Primary Examiner.*

S. N. RICE, T. E. PERTILLA, *Assistant Examiners.*